United States Patent [19]
Whittier et al.

[11] Patent Number: 5,667,356
[45] Date of Patent: Sep. 16, 1997

[54] ACID/SLURRY GOVERNOR SEAL ASSEMBLY FOR CENTRIFUGAL PUMPS

[75] Inventors: John D. Whittier, Lakewood; Douglas W. Drussel, Littleton, both of Colo.

[73] Assignee: A. R. Wilfley & Sons, Inc., Denver, Colo.

[21] Appl. No.: 646,686

[22] Filed: May 6, 1996

[51] Int. Cl.[6] .................................................. F04D 29/08
[52] U.S. Cl. ............................................. 415/34; 415/113
[58] Field of Search .................................. 415/30, 33, 34, 415/113

[56] References Cited

U.S. PATENT DOCUMENTS

| | | | |
|---|---|---|---|
| 1,346,926 | 7/1920 | Wilfley . | |
| 1,556,657 | 10/1925 | Wilfley | 415/30 |
| 1,976,532 | 10/1934 | Wilfley | 415/34 |
| 2,272,454 | 2/1942 | Wilfley | 415/30 |
| 2,608,423 | 8/1952 | Wilfley | 415/34 |
| 2,660,487 | 11/1953 | Wilfley | 415/34 |
| 3,137,237 | 6/1964 | Zagar et al. | 415/113 |
| 3,472,169 | 10/1969 | Dyke et al. | 415/30 |
| 3,515,497 | 6/1970 | Studebaker et al. . | |
| 3,652,180 | 3/1972 | Choquette et al. | 415/34 |
| 4,915,579 | 4/1990 | Whittier et al. . | |

*Primary Examiner*—John T. Kwon
*Attorney, Agent, or Firm*—John E. Reilly

[57] ABSTRACT

Centrifugal pumps for handling acids or slurries incorporate a ball bearing assembly as the force-responsive governor to control opening and closing of a fluid path leading from the expeller region into a seal, the seals being composed of hard, low-friction sealing materials for handling acids and of resilient materials for handling slurries owing to the solids content in the slurries.

23 Claims, 2 Drawing Sheets

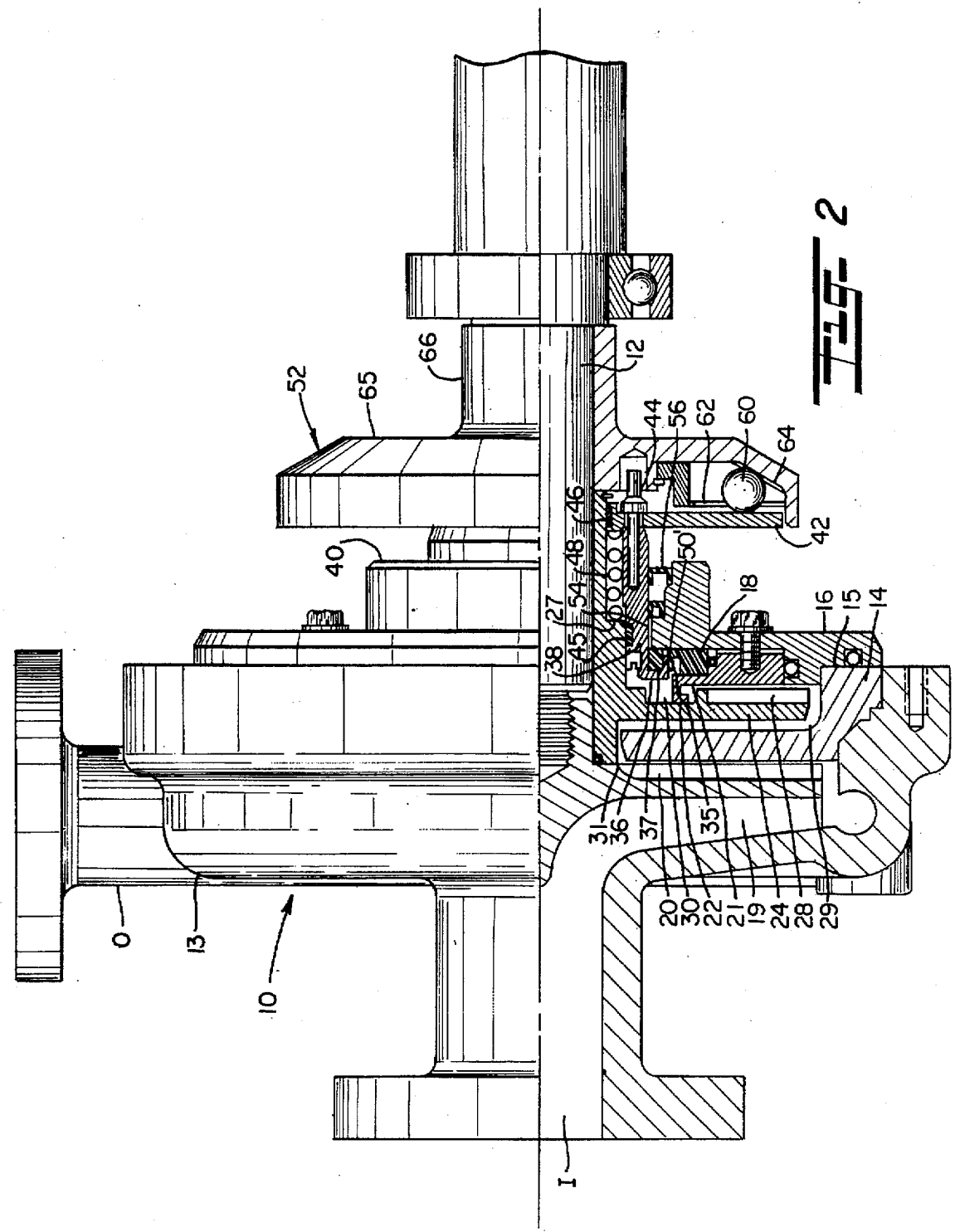

ACID/SLURRY GOVERNOR SEAL ASSEMBLY FOR CENTRIFUGAL PUMPS

BACKGROUND AND FIELD OF INVENTION

This invention relates to seal assemblies for centrifugal pumps of the hydraulic sealing type and which are specifically adaptable for use in pumping acids or slurries.

Seal assemblies for centrifugal pumps are specifically designed for applications in which the pump is required to handle either an acid-type liquid or slurry-type liquid. The term "acids" is intended to refer to clear or solid-free liquids in which there is no problem of solids tending to block or score the seal surfaces. As a result, it is possible to use relatively hard materials at the seal points or surfaces. "Slurries" refer more to liquids which contain solids and which will tend to cause scoring. As a result, the seal assembly should employ relatively soft or low durometer rubber materials which have sufficient resiliency or "bounce" at the seal surfaces that the solids will not tend to score the faces.

In both applications described above, the pump should be capable of operating without a packing gland or mechanical seal which bears directly against a rotating part. In other words, when the pump is operating, it will hydraulically seal against leakage of liquid from the expeller region into the seal housing or reservoir of the pump. When the pump is no longer in operation or at rest and has no hydraulic sealing capability, it is important that a seal be rapidly established to prevent leakage of the liquid into the seal housing or reservoir, and that the seal be designed to most effectively seal against the type of liquid being handled by the pump.

Pumping apparatus has been devised in the past to achieve the above objectives and, for example, reference is made to U.S. Pat. Nos. 3,515,497 to Studebaker et al and 4,915,570 to J. D. Whittier et al. Both of the aforementioned patents are assigned to the assignee of this invention and both employ centrifugal force-responsive, weighted levers to regulate opening and closing of the valve member or seal at the beginning and end of the pump operation. Nevertheless, there are numerous acid and slurry applications in which it is desirable to employ a ball and cam-type governor to regulate opening and closing of the seal assembly which is compact and of simplified construction while being conformable for different weight, size and speed pumps simply by selecting the optimum number of balls.

Ball-type governors have been employed in the past and, for example, reference is made to U.S. Pat. No. 1,346,926 to A. R. Wilfley in which the balls are employed to prevent the entrance of air between a shaft and chamber of the pump as opposed to controlling the opening and closing of a passage between the expeller chamber and conventional seal housing of the pump. It is therefore an important consideration to provide a seal assembly for the particular type of liquid being handled which is capable of rapid opening and closing movement in direct response to movement of the governor, exhibits good wear characteristics and is easy to assemble and install.

SUMMARY OF THE INVENTION

It is an object of the present invention to provide for a novel and improved seal assembly for centrifugal pumps and for a governor to closely control opening and closing of the seal assembly at the beginning and end of the pump operation.

It is another object of the present invention to provide for a governor mechanism to control opening and closing of a seal assembly in the path of liquid between the expeller region and seal housing of a pump.

It is a further object of the present invention to provide for a governor mechanism in a centrifugal pump in which a plurality of centrifugal force-responsive balls directly control opening and closing of a seal assembly at the beginning and end of pump operation; and further wherein the number of balls or cams may be selected in accordance with the weight, size and speed of the pump to most effectively control opening and closing of a seal assembly.

It is a still further object of the present invention to provide in a centrifugal pump for optional seal assemblies selected in accordance with the type of liquid being handled to minimize if not prevent leakage of liquid from the expeller region into the seal housing of the pump when the pump is not in operation.

In accordance with the present invention, a novel and improved seal assembly is provided for a centrifugal pump of the type having a pump casing with a seal housing in outer spaced surrounding relation to a drive shaft, an impeller mounted on the drive shaft to discharge liquid introduced through an outlet, and an expeller between the impeller and seal housing to resist liquid flow past the impeller into the seal housing when the pump is in operation, the improvement comprising an actuator sleeve which is slidable axially with respect to the drive shaft, a driver at one end of the actuator sleeve including centrifugal force-responsive means movable between a radially inward position when the drive shaft is at rest and a radially outward position when the drive shaft is rotated for imparting axial movement to the actuator sleeve, an annular stationary seal member, first retaining means for retaining the stationary seal member in fixed relation to the pump casing, a movable seal member, and second retaining means for retaining the movable seal member at an opposite end of the actuator sleeve wherein the second retaining means is movable into and away from engagement with the stationary seal member in response to movement of the centrifugal force-responsive means into and away from the radially inward and outward positions. In the preferred form, the driver must overcome a spring in urging the second retaining means away from sealed engagement with the stationary seal, the driver taking the form of a ball bearing assembly having a series of balls which move radially outwardly along a cam surface so as to exert axial pressure on a control portion of the actuator sleeve.

Both in preferred and modified forms of the invention, the seal assembly is located in the liquid path between the expeller region and a conventional seal housing between the pump casing and actuator sleeve. In handling acids, or solid-free liquids, the stationary and movable seals are composed of relatively hard, plastic low-friction materials with the movable seal(s) responding to movement of the actuator sleeve in moving into and away from liquid-tight sealed engagement with the stationary seal(s). In handling slurries which may contain entrained solids, the movable and stationary seals are preferably composed of resilient rubber or rubber-like materials which will resist any tendency of the solid particles to become lodged along their contacting surfaces and are not as prone to scoring by the solid particles as are the harder high durometer materials employed in acid applications.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 2 is another sectional view of the inner working parts of a modified form of centrifugal pump adaptable for use in slurry applications.

DETAILED DESCRIPTION OF PREFERRED EMBODIMENT

Figure 1:
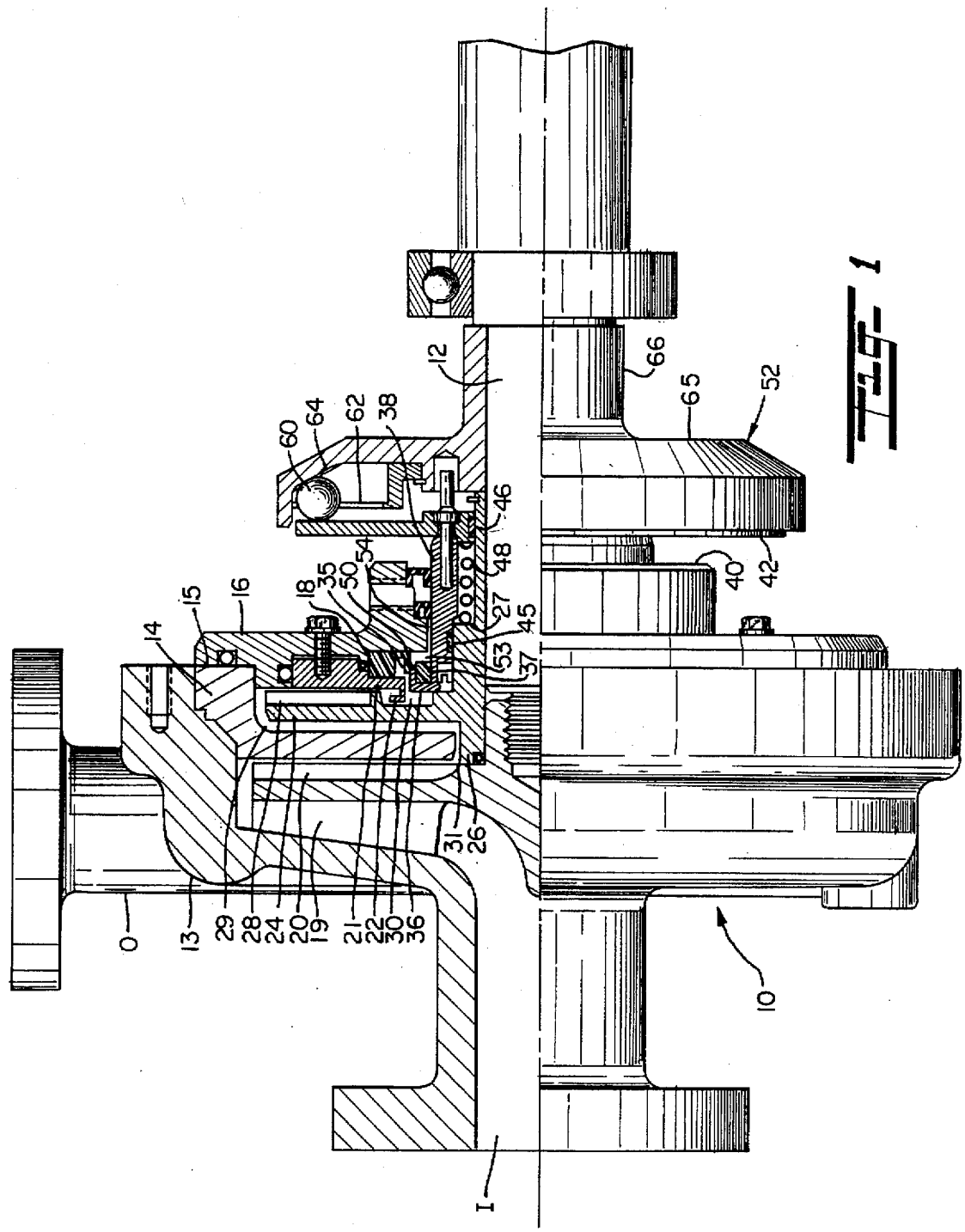
FIG. 1 is a sectional view of the inner working parts of a centrifugal pump, illustrated in the open and closed position, and specifically adaptable for use in acid applications.

Referring in more detail to the drawings, there is shown in FIG. 1 the inner working parts of a centrifugal pump 10 in which a central bore is provided for insertion of a drive shaft 12 and an outer pump casing 13 includes an annular caseplate 14 which is affixed at its outer radial edge 15 to an expeller plate 16, the latter being recessed to receive a seal 18. The pump casing 13 has an inlet I at its forward end for introduction of a liquid into an impeller 19 which is mounted for rotation on the drive shaft 12, the liquid being discharged in a radially outward direction through an outlet O in the pump casing; and in accordance with well-known practice the pump casing is mounted on a suitable base such that the drive shaft 12 is disposed on a horizontal axis.

The impeller 19 is mounted on the forward end of the drive shaft 12 and carries with it a primary expeller 20 just forwardly of the caseplate 14. A secondary expeller 24 includes a hub 26 which is mounted for rotation to the drive shaft 12, the expeller 24 being provided with rearwardly directed, radially extending vanes 28 in facing, closely spaced relation to the expeller plate 16. The expeller plate 16 includes a radially inner, offset radial extension 21 which terminates in a U-shaped lip 22 in facing relation to the expeller 24. In this relation, the expeller 24 is axially spaced between the radial wall of the caseplate 14 and the expeller plate 16 to establish circumferentially extending gaps 29 and 30 in communication with one another around the outer peripheral end of the expeller 24 and forming a part of a continuous fluid channel to communicate with the primary expeller region via gap 31 which extends rearwardly from the primary region into communication with the gap 29.

The radial extension 21 of the plate 16 forms an annular recess with the front wall surface of a seal housing portion 40 of the expeller plate 16 for insertion of the seal 18 which is preferably an O-ring seal. The seal 18 includes a radially inwardly spaced, axially extending lip 35 directly behind but slightly inwardly of the lip 22 of the plate 16. The seal 18 is stationary with the lip 35 engaging an outer peripheral surface 50' of a rotary seal housing 36 at a forward end of a sleeve-like actuator body 38, the housing 36 retaining a seal ring 37. The actuator body 38 is disposed in outer surrounding relation to the hub 26 and in inner concentric relation to a seal housing portion 40 of the plate 16. An actuator wall 42 acts as a control portion for movement of the body 38 and is defined by a generally annular disk which is affixed to a rearward end of the body 38 by circumferentially spaced fasteners 44. TEFLON® slide bearings 45 and 46 are interposed between confronting surface portions of the actuator body 38 and hub 26, respectively. A return spring 48 is seated in a recess formed between a shoulder 27 on the hub and inner radial edge of the actuator wall 42, the spring 48 being mounted under compression to normally urge the actuator body 38 in a rearward direction causing the seal 37 to bear against the front wall surface of the housing portion 40. In this relation, the rotary seal housing 36 at the forward end of the actuator body 38 is of somewhat U or channel-shaped configuration to define a recess for secure retention of the seal ring 37, and an outer peripheral surface 50' of the outer side wall 50 of the housing 36 bears against the lip 35 of the stationary seal 18 when in the closed position. The outer peripheral surface 50' preferably is tapered slightly in a rearward direction away from the lip 35 so that when the actuator body 38 is advanced in a forward direction during pump operation, in a manner to be described, the surface contact and pressure between the surface 50' of the rotating seal housing and the stationary lip 35 is substantially reduced. Nevertheless, there is a sufficient degree of contact to resist leakage of the liquid from the gap 30 into the gap or space 53 between the seal 37 and housing portion 40. If there is any slight leakage, the liquid will merely seep through the gap or space 53 into the space 54 between the radially inward wall of the housing 40 and the actuator body 38. A standard grease seal assembly 56 is interposed between the housing 40 and actuator body 38 so that any fluid which is permitted to escape past the seal 37 will be retained in the space 54 ahead of the grease seal assembly 56 and prevent any further leakage beyond the grease seal assembly 56. The degree of taper of the surface 50' may be very slight, on the order of 2° to 3° which has been found to be adequate for the surface 50' to effect firm mechanical pressure or engagement with the lip 35 to prevent leakage past the surfaces when the pump is not in operation and to minimize the frictional contact or rubbing between the surfaces when the pump is in operation.

A governor mechanism or driver 52 preferably takes the form of a ball bearing and race assembly made up of a series of circumferentially spaced balls 60 retained in a ball race 62 in which the balls are free to slide or roll in a radial direction along a radially outwardly convergent cam surface 64 and the actuator wall 42. Thus, the cam surface 64 forms a part of a rearward end wall 65 which is mounted for rotatio through a drive sleeve 66 with the drive shaft 12. The actuator wall 42 defines a forward end wall of the ball bearing assembly which is movable in a forward direction under the radial outward movement of the balls 60 along the cam portion 64 to overcome the return spring 48 and advance the seal retainer 36 in a forward direction, as shown in the upper half section of FIG. 1.

When the pump is at rest, the balls 60 will be disposed in an inward radial position as illustrated in the closed position, or lower half section of FIG. 1, in contact with the radially inner surface portion of the cam surface 64, and the actuator body 38 is urged rearwardly under the force of the return spring 48 to force the seal ring 37 into the closed position against the housing 40 and the tapered surface 50' into sealed engagement with the lip 35. When the pump is activated to impart rotation to the drive shaft at a predetermined rate of speed, the centrifugal force will cause the balls 60 to ride outwardly along the cam surface 64 and exert a forward pressure against the actuator wall 42 overcoming the urging or bias of the spring 48 to advance the seal housing 36 and seal 37 away from the closed position into the open position shown in the upper half section of FIG. 1. As previously noted, forward advancement of the seal retainer 36 will cause the tapered surface 50' to relieve its mechanical pressure against the seal lip 35. Utilization of the ball bearing assembly 52 for this purpose has been found to be a highly effective but simplified way of rapidly advancing the seal retainer 36 and seal ring 37 to the open position as the drive shaft reaches full operating speed, at which time the hydraulic sealing capacity of the expeller will effectively prevent leakage of fluid past the seals 37 and 18 into the grease seal assembly 56. In addition, any fluid that may have leaked into the gaps 53, 54 and 30 will be encouraged to return into the expeller region during pump operation. Accordingly, as long as the leakage of fluid to the grease seal assembly 56 is held to a minimum, it will be capable of retaining the liquid and prevent its escape beyond the grease seal assembly to the exterior. Correspondingly, when the pump is deactivated and the drive shaft stops rotating, the balls 60 will rapidly return to the inward radial position shown in the lower view of FIG. 1, and the seal retainer 36 will rapidly return the seal 37 to the closed or sealed position as described as well as to mechanically seal the pump against leakage past the seal interface 50'/35.

In handling acids or solid-free liquids, seals 37 and 18 preferably are of a low friction material, such as, TEFLON®. For example, the seal 37 may be a TURCON® 577 Varilip seal, manufactured and sold by American Variseal of Broomfield, Colo. and the seal ring 37 may be a TEFLON® material by the same manufacturer.

DETAILED DESCRIPTION OF SLURRY-TYPE SEAL ASSEMBLY

There is illustrated in FIG. 2 a modified form of invention specifically adaptable for use in handling slurries in which solid particles may be entrained in the liquid and tend to collect along the seal surfaces. Like parts to those of the acid form of pump shown in FIG. 1 are correspondingly, enumerated with prime numerals. Once again, an expeller 24' is axially spaced between the radial wall of the case plate 14' and expeller plate 16' to establish circumferentially extending gaps 29' and 30' the gap 29' communicating with the primary expeller region via gap 31'. A radially inward extension 21' of the plate 16' defines an annular recess with the front wall surface of the housing 40' for insertion of an outer seal block 70 of a movable seal assembly 72. The seal block 70 is retained in fixed relation to a stationary seal 76 which is fixed in a recess in the radially inward portion of the front wall surface of the housing 40'.

A governor mechanism or driver 52' corresponding to that of FIG. 1 includes a movable actuator wall 42' and actuator body 38' with a return spring 48' seated in a recess between shoulder 27' on the hub 26' and the actuator wall 42' and the spring 48' is mounted under compression to bias the body 38' in a rearward direction.

A rotary seal retainer 78 at the forward or leading end of the body 38' includes a radial wall 79 and axial wall 80 in mutually perpendicular relation to one another so as to define an open groove or recess for mounting of an inner seal block 82. The inner seal block 82 is joined to the outer seal block 70 by an annular wall or diaphragm 74 of generally toroidal-shaped configuration and having its convex surface curving or directed away from the expeller 24' and toward the stationary seal 76. The diaphragm 74 is molded to the inner and outer seal blocks 70 and 82 such that at least the front end portions of the diaphragm 74 are united with the facing surfaces of the seal blocks 70 and 82, and the diaphragm is illustrated in its relaxed state in the upper view of FIG. 2 in which the actuator body 38' is shown advanced to a forward position by the governor mechanism 52' and the inner seal block 82 loosely seated against the seal retainer 78. In this way, a liquid path is established from the gap 30' along the interface between the inner seal block 82 and walls 79, 80 of the housing 78 into the clearance space between the seal 76 and wall 79 as well as the external surface of the actuator body 38' leading back to the grease seal assembly 56'. However, when the pump is turned off, the return spring 48' will overcome the force of the governor mechanism 52' and return the seal retainer 78 to its closed position as shown in the lower view of FIG. 2. Fluid pressure will increase in the gap 30' to force the inner seal block 82 rearwardly with the seal retainer 78 and effectively prevent seepage of fluid between the seal block 82 and wall 79.

The operation of the governor mechanism and its control of the seal assembly as described in opening and closing the leakage path to the grease seal assembly 56' is the same as that described with reference to FIGS. 1 and 2 and therefore will not be repeated. In order to discourage wear or scoring of the seal surfaces in handling slurries, the diaphragm seal 72 as well as the stationary seal 76 are composed of relatively soft or low durometer rubber or rubber-like materials which have sufficient resiliency or bounce to prevent solids from tending to collect along the seal interfaces. For the purpose of illustration but not limitation, the seals 72 and 76 may be a 60D Viton seal, manufactured and sold by Holtz Rubber of Lodi, Calif.

It is therefore to be understood that while alternate forms of invention are herein set forth and described, various modifications and changes may be made in the construction of parts as well as composition of materials without departing from the spirit and scope of the present invention as defined by the appended claims and reasonable equivalents thereof.

We claim:

1. In a seal assembly for a centrifugal pump wherein a pump casing includes a housing portion in outer spaced surrounding relation to a drive shaft, an impeller mounted on said drive shaft to discharge liquid introduced through an inlet, and an expeller between said impeller and said housing portion to resist liquid flow past said expeller into said housing portion when said pump is in operation, the improvement comprising:

an actuator sleeve slidable axially with respect to said drive shaft;

a driver assembly at one end of said actuator sleeve, said driver assembly including centrifugal force-responsive means movable between a radially inward position when said drive shaft is at rest and a radially outward position when said drive shaft is rotated whereby to impart axial movement to said actuator sleeve, and a control portion operatively connected to said actuator sleeve;

an annular stationary seal in fixed relation to said pump casing; and a movable seal member, including retaining means for retaining a movable seal at an opposite end of said actuator sleeve, wherein said retaining means is pressible against said stationary seal, and said retaining means is movable to increase and reduce the pressure on said stationary seal in response to movement of said centrifugal force-responsive means into and away from said radially inward and radially outward positions.

2. In a seal assembly according to claim 1 wherein bias means is provided for urging said retaining means into firmer engagement with said stationary seal and said centrifugal force-responsive means is operative to overcome said bias means to advance to said radially outward position when said drive shaft is rotated.

3. In a seal assembly according to claim 1 wherein said movable seal is movable into and away from engagement with said pump casing as said retaining means moves to increase and reduce pressure on said stationary seal.

4. In a seal assembly according to claim 1 wherein any liquid which leaks from between said expeller and said pump casing behind said expeller may seep between said movable seal member and said pump casing when said retaining means is moved to reduce the pressure on said stationary seal.

5. In a seal assembly according to claim 1 wherein said stationary seal and said movable seal member are of annular configuration including at least one tapered surface portion in sealed engagement with another surface portion and wherein axial movement of said movable seal member in response to movement of said centrifugal force-responsive means into said radially outward and radially inward positions varies the firmness of engagement of said tapered surface portion with said other surface portion.

6. In a seal assembly according to claim 5 wherein said movable seal is movable into and away from abutting relation to said pump casing.

7. In a seal assembly according to claim 1 wherein said retaining means has an axially extending tapered surface portion engageable with a complementary surface portion on said stationary seal, and said movable seal is movable into and away from sealed engagement with said pump casing with said surface portions undergoing increased pressure against one another when said movable seal is moved into sealed engagement with said pump casing.

8. In a seal assembly according to claim 7 wherein said retaining means defines a radially outward continuation of said opposite end of said actuator sleeve, said retaining means being of generally U-shaped cross-sectional configuration to substantially surround three sides of said movable seal wherein expansion of said movable seal increases its retention by said retaining means.

9. In a seal assembly according to claim 1 wherein said centrifugal force-responsive means includes ball bearings and a ball race on one side of said ball bearings opposite to said control portion converging in a radially outward direction toward said control portion.

10. In a seal assembly according to claim 1 wherein said stationary seal is in the form of a lip seal having an extension leg provided with a surface portion complementary to a tapered surface portion on said movable seal member.

11. In a seal assembly according to claim 1 wherein said housing portion is disposed in surrounding relation to said actuator sleeve, said retaining means is defined by a radially outwardly extending seal retainer at said opposite end of said actuator sleeve to said driver assembly, and said movable seal is retained in said seal retainer for movement into and away from engagement with said pump casing.

12. In a seal assembly according to claim 1 wherein said stationary seal is disposed on said pump casing, said movable seal including inner and outer spaced concentric annular seal portions, said inner seal portion seated on said retaining means and said outer seal portion being fixed with respect to said stationary seal, and a rolling diaphragm between said inner and outer seal portions yieldingly supporting said inner seal on said retaining means.

13. In a seal assembly according to claim 12 wherein an expeller plate is mounted on said pump casing and said outer seal portion is interposed between said expeller plate and said stationary seal.

14. In a seal assembly according to claim 13 wherein said inner seal portion is slidable along a radially inner surface portion of said expeller plate in response to axial movement of said seal retainer.

15. In a seal assembly according to claim 12 wherein said stationary seal and said inner and outer seal portions are composed of resilient low-durometer materials.

16. In a seal assembly for a centrifugal pump wherein a pump casing includes a housing portion in outer spaced surrounding relation to a drive shaft, an impeller mounted on said drive shaft to discharge liquid introduced through an inlet, and an expeller between said impeller and said housing portion to resist liquid flow past said expeller into said housing portion when said pump is in operation, the improvement comprising:

an actuator sleeve slidable axially in surrounding relation to said drive shaft including a radially outwardly extending control portion;

a driver at one end of said actuator sleeve including a plurality of balls movable between a radially inward position when said drive shaft is at rest and a radially outward position when said drive shaft is rotated whereby to impart axial movement to said control portion;

an annular stationary seal in fixed relation to said pump casing; and a movable seal member, including retaining means for retaining movable seal at an opposite end of said actuator sleeve, wherein said retaining means is engageable with said stationary seal and is movable to increase and reduce engagement with said stationary seal in response to movement of said balls into and away from said radially inward and radially outward positions.

17. In a seal assembly according to claim 16 wherein spring means are provided for urging said retaining means into firmer engagement with said stationary seal, and said driver including a ball race having a cam surface on one side to cause said balls to advance to said radially outward position when said drive shaft is rotated.

18. In a seal assembly according to claim 16 wherein any liquid which leaks from between said expeller and said pump casing behind said expeller may seep between said movable seal member and said pump casing when said retaining means is moved to reduce pressure on said stationary seal, and wherein said retaining means moves said movable seal into and away from engagement with said pump casing as said retaining means moves to increase or decrease the pressure on said stationary seal.

19. A seal assembly according to claim 16 wherein said movable seal is movable into and away from abutting relation to said pump casing, said retaining means comprises a tapered surface portion, and wherein said stationary seal and said movable seal member are of annular configuration wherein axial movement of said movable seal away from said pump casing causes the tapered surface portion to move to reduce pressure on said stationary seal.

20. A seal assembly according to claim 16 wherein said movable seal member includes a seal retainer of generally U-shaped cross-sectional configuration having an axial tapered portion engageable with a complementary flexible portion on said stationary seal and an O-ring seal disposed in said retainer, and wherein said O-ring is movable into and away from sealed engagement with said pump casing.

21. A seal assembly according to claim 16 wherein said housing portion is disposed in surrounding relation to said actuator sleeve, a radially outwardly extending seal retainer is disposed at an opposite end of said actuator sleeve to said control portion, and said movable seal is composed of a resilient material retained in said seal retainer for movement into and away from engagement with said pump casing.

22. A seal assembly according to claim 16 wherein said stationary seal is disposed on said pump casing, said movable seal including inner and outer spaced concentric annular seal portions each composed of a resilient material, said inner seal portion seated on said seal retainer and said outer seal portion being fixed with respect to said stationary seal, and a rolling diaphragm between said inner and outer seal portions yieldingly urging said inner seal into engagement with said seal retainer for movement with said seal retainer.

23. A seal assembly according to claim 9 wherein an expeller plate is mounted on said pump casing and said outer seal portion is interposed between said expeller plate and said stationary seal, and wherein said inner seal portion is slidable along a radially inner surface portion of said expeller plate in response to axial movement of said seal retainer.

* * * * *